(12) United States Patent
Shackleford

(10) Patent No.: US 7,065,510 B2
(45) Date of Patent: Jun. 20, 2006

(54) COMBINATORIAL FITNESS FUNCTION CIRCUIT

(75) Inventor: J. Barry Shackleford, Portola Valley, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 337 days.

(21) Appl. No.: 09/986,531

(22) Filed: Nov. 9, 2001

(65) Prior Publication Data

US 2003/0093391 A1 May 15, 2003

(51) Int. Cl.
 G06F 15/18 (2006.01)
 G06N 3/00 (2006.01)
 G06N 3/12 (2006.01)
(52) U.S. Cl. .............................. 706/13; 706/12; 706/14
(58) Field of Classification Search ................. 706/13, 706/12, 14
 See application file for complete search history.

(56) References Cited

U.S. PATENT DOCUMENTS

| | | | | |
|---|---|---|---|---|
| 5,970,487 A | * | 10/1999 | Shackleford et al. | 707/6 |
| 6,185,547 B1 | * | 2/2001 | Shackleford et al. | 706/13 |
| 6,411,944 B1 | * | 6/2002 | Ulyanov | 706/13 |
| 2003/0050902 A1 | * | 3/2003 | Buczak et al. | 706/13 |

* cited by examiner

*Primary Examiner*—Joseph P. Hirl

(57) ABSTRACT

A fitness function circuit for computing a fitness value for a trial solution to a combinatorial problem accelerates the execution speed of a genetic algorithm machine by evaluating trial solutions at the rate of one evaluated solution per clock cycle. The circuit uses repeated tables of data which describe costs associated with each portion of each trial solution to find the total cost associated with each solution. By increasing memory used and repeating the data tables rather than accessing one table multiple times, and by adding each portion of each trial solution substantially simultaneously, the speed of one evaluated solution per one clock cycle is achieved.

18 Claims, 6 Drawing Sheets

COMBINATORIAL FITNESS FUNCTION CIRCUIT

TECHNICAL FIELD OF THE INVENTION

The present invention relates generally to a genetic algorithm machine for executing genetic algorithms, and more specifically to an apparatus for computing the fitness of a chromosome that represents a trial solution to a combinatorial-type optimization problem to be solved by the genetic algorithm machine.

BACKGROUND

Although evolutionary computing has roots as far back as the 1950s, genetic algorithms (hereinafter referred to by the initials GA) were introduced in 1975 by John Holland as a method for finding an optimum or near optimum solution to complicated problems. As noted by another researcher, Grefenstette, the GA is a useful method for finding optimum solutions to the Traveling Salesman Problem, a classic and well-known computationally intractable problem.

With reference now to FIG. 1, there is illustrated therein a conceptual model of evolution in a genetic algorithm and how a solution to a problem evolves in processing the GA, generally designated by the reference numeral 100. As is understood in this art, in a genetic algorithm, an emulated chromosomal data structure is initially designed to represent a candidate or trial solution. A number of n-bit chromosomes of that data structure are then randomly generated and are registered in groups or populations of solutions. Parent chromosomes are selected from this population of generated chromosomes according to a given algorithm, e.g., selected chromosomes 105 and 110 in FIG. 1. Each generated chromosome is assigned a unique problem-specific fitness which may or may not differ from other chromosomes in the population, identifying the solution quality of the chromosome. The problem-specific fitness is expressed by a fitness value, as is known in the art. In a true evolutionary, survival of the fittest manner, particular chromosomes are selected from the population of chromosomes in proportion to their fitness values with more-fit chromosomes having a higher probability of being selected.

As further illustrated in FIG. 1, when a pair of parent chromosomes, e.g., chromosomes 105 and 110, are selected from the population, the parent chromosomes are combined using a probabilistically generated cut point, designated by the reference numeral 120. In the case of having no cutpoint generated, either of the parent chromosomes is simply copied to provide a new chromosome as a child chromosome. Thus, a child chromosome is created and outputted. The child chromosome, therefore, contains portions of each parent or the whole portion of a parent, e.g., a child chromosome 125 contains portion 105A of parent chromosome 105 and portion 110B of parent chromosome 110, as illustrated in FIG. 1. The child chromosome may then be mutated in a controlled manner, preferably having a low probability. In the evolutionary example illustrated in FIG. 1, the mutation is performed through inversion of a bit 130 in the child chromosome 125, e.g., 0 to 1 or 1 to 0. A mutated child chromosome 125' is then evaluated to be assigned its fitness value. An evaluated child chromosome along with its fitness value is then stored as a member of the next generation in the population, perhaps replacing one or both of the associated parent chromosomes 105 and 110.

After repeated iteration of this evolutionary process, the general fitness of chromosomes in the population improves to the optimal solution. Thus, a solution to the problem emerges in the population, and is acquired with highly-fit chromosomes concentrated in the population.

In a conventional approach, a GA is emulated by software and the algorithm used for computing the fitness of a GA-based candidate solution to the combinatorial problem is also emulated by software. Due to such a software-based emulation on conventional computers, however, the execution speed of the algorithm for finding an optimum solution to the combinatorial problem is extremely slow. Indeed, a major drawback of conventional genetic algorithm machines is the slow execution speed of a GA when emulated by software on conventional, general-purpose computers.

A hardware-based implementation of a GA has been devised for offsetting the drawback but only with a limited success in its execution speed. For example, U.S. Pat. No. 5,970,487 to Shackleford, et al. solved some of the drawbacks and disadvantages of prior art techniques, particularly speed of operation, by the utilization of a hardware-based framework for accelerated used of genetic algorithms. The advantages and usages of the Shackleford et al. invention, Shackleford being the sole inventor in the instant application, are fully described in U.S. Pat. No. 5,970,487, which is incorporated by reference herein.

The Shackleford et al. invention as described is an efficient problem-solving machine that may evolve solutions to many different problems. A common problem that is generally solved using a genetic algorithm is a combinatorial problem, also called a routing or ordering problem. A particularly intractable combinatorial problem is a so-called non-deterministic polynomial hard (NP-hard) problem, which may be solved through a resource selection from among many resources, by an applied form of a GA, minimizing the hardware architecture, of a logic circuit, for example, and generating a resultant optimum solution.

An example of an NP-hard combinatorial problem is the aforementioned Traveling Salesman Problem (or TSP), as is known in the art, which can be used to model many combinatorial, routing and ordering problems. The TSP seeks to find the shortest route between n cities, and while any solution which contains all n cities once and only once is valid, some solutions are better than others. A solution to this problem describes the order of travel between cities, which determines the distance of the route traveled, so the order of travel between cities having the shortest route is the best solution. As is well understood in the mathematical and computer algorithm arts, the TSP is an NP-hard combinatorial problem with n! potential solutions and (n−1)! unique solutions.

With reference now to FIG. 2, there is illustrated an example solution and its fitness for an 8-city Traveling Salesman Problem. The solution to the TSP is in the form of the order traveled and yields a fitness value calculated from a distance $D_{x,y}$ of each new city from the last. In this example, the possible solution to the 8 city TSP {0, 4, 2, 7, 5, 6, 3, 1} corresponds to the fitness value $D_{Total} = D_{0,4} + D_{4,2} + D_{2,7} + D_{7,5} + D_{5,6} + D_{6,3} + D_{3,1} + D_{1,0}$, as in understood to those skilled in the art. As illustrated in FIG. 2, other routes are possible and, alternatively, a possible solution can include information of order traveled from any city to any other, with no repetition of cities. For simplicity, not all possible routes are shown in FIG. 2.

Because of the large number of possible solutions to a TSP, e.g., a 32-city TSP has over $2.5*10^{35}$ solutions, heuristic and non-deterministic solving methods must be used to solve this type of problem. The TSP can be solved, therefore, through an optimal solution-finding approach that aims at attaining an optimal or near optimal solution through a screening process of candidate or trial solutions created through a GA, based upon a fitness evaluation of the candidate solutions. In this approach, more-fit candidate solutions are selected with less-fit candidate solutions screened out to concentrate highly-fit solutions or chromosomes and in the end to reach an optimal or near optimal solution.

The Shackleford et al. invention as described hereinabove achieves a significant increase in execution speed in its hardware implementation. The Shackleford et al. invention is a general purpose GA machine that can solve any problem by using the appropriate chromosome generation template and fitness function circuit. However, general purpose machines are always less efficient than task-specific dedicated machines, and the GA machine is no exception.

There is, therefore, a present need to provide a problem-specific, combinatorial-type fitness function circuit which performs a high speed fitness evaluation of candidate solutions generated through a GA. What is needed is, accordingly, an invention to provide a hardware-based fitness function circuit which accelerates the execution speed of a GA. What is needed is an invention to provide a hardware-based fitness function circuit.

The present invention describes a method to provide a high-speed, hardware-based fitness function that will match the performance of the hardware-based implementation of the GA.

It is, accordingly, an aspect of the present invention to provide a problem-specific, combinatorial-type fitness function circuit which performs a high speed fitness evaluation of candidate solutions generated through a GA.

It is another aspect of the present invention to provide a fitness function circuit which accelerates the execution speed of a GA.

It is a further aspect of the present invention to provide a hardware-based fitness function circuit.

SUMMARY

According to an embodiment of the present invention, a fitness function circuit for an execution of a genetic algorithm (GA) inputs a chromosome having n bits and outputs a fitness of the chromosome. The fitness is calculated as a solution to a combinatorial-type problem.

The fitness function circuit is a hardware circuit for calculating the cost of the elements indicated by the chromosome inputted, and then calculating the fitness of the chromosome based upon a calculated cost of elements indicated. The fitness function may include a solution register, a plurality of data tables, and a carry-save-adder.

The fitness function circuit receives a chromosome and stores the chromosome in the solution register. Each two consecutive values of the chromosome from the register are used to query multiple, identical data tables. Thus, by repeating the data tables and accessing the data tables in parallel, the circuit operates in a minimum amount of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The features, aspects, and advantages of the present invention will become better understood with regard to the following description, appended claims, and accompanying drawings where:

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

The present invention is directed to a fitness function circuit for a combinatorial problem, such as the Traveling Salesman Problem, optimized for use on a genetic algorithm (GA) machine, such as that set forth in Shackleford et al. To assist in the general explanation of the operation of the fitness function circuit of a GA machine, reference is now made to FIG. 3, which shows a flowchart of a GA with parent chromosomes P1 and P2, a child chromosome C, a mutated child chromosome C', and a fitness value F, all described in more detail hereinbelow.

Figure 3:
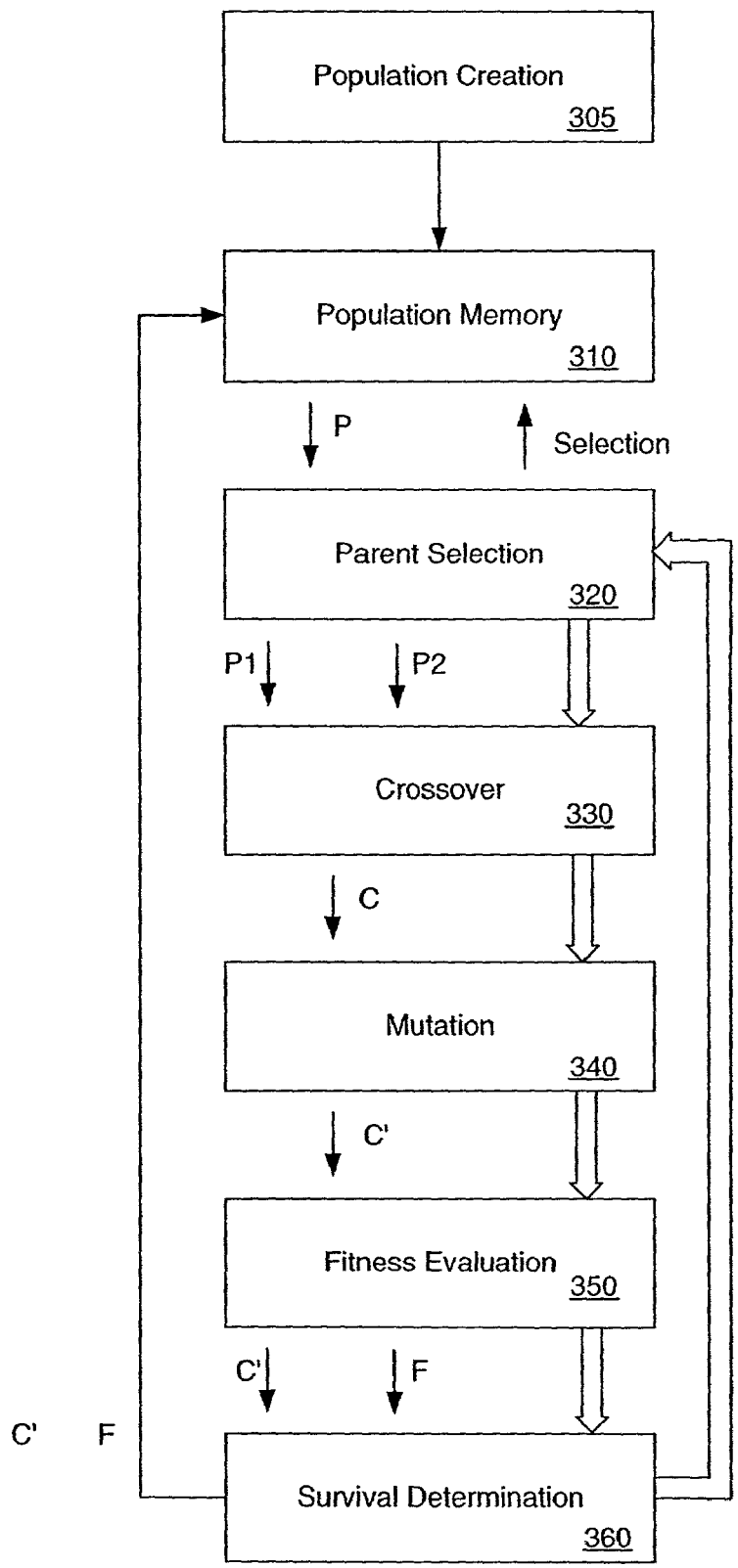
FIG. 3 depicts a flowchart illustrating a flow of the GA according to the present invention.

With reference now to FIG. 3, there is illustrated the first step in the flowchart of the GA, which is to create (step 305) a population of randomly generated chromosomes, evaluate their respective fitness values and store the chromosomes and their respective fitness values in a population memory 310.

A parent chromosome (generally designated by the reference symbol P) is then randomly selected (step 320) from the population memory 310 and assigned the first parent chromosome P1. It should be understood that when a parent chromosome is newly selected, the parent chromosome that was previously assigned the first parent chromosome P1 is re-assigned the second parent chromosome P2. The newly-selected parent chromosome P then becomes the first parent chromosome P1.

A child chromosome C is then created (step 330) from the two parent chromosomes P1 and P2, respectively, through a crossover process, such as described above in connection with FIG. 1. In other words, the crossover process is a single-point crossover, whereby the first and second parent chromosomes P1 and P2 are divided, each at the same bit location, and the data to the left of that location in the first parent chromosome P1 is used to form the left part of a child chromosome C and the data inclusive of the bit and to the right in the second parent chromosome P2 is used to form the right part of the child chromosome C.

Figure 1:
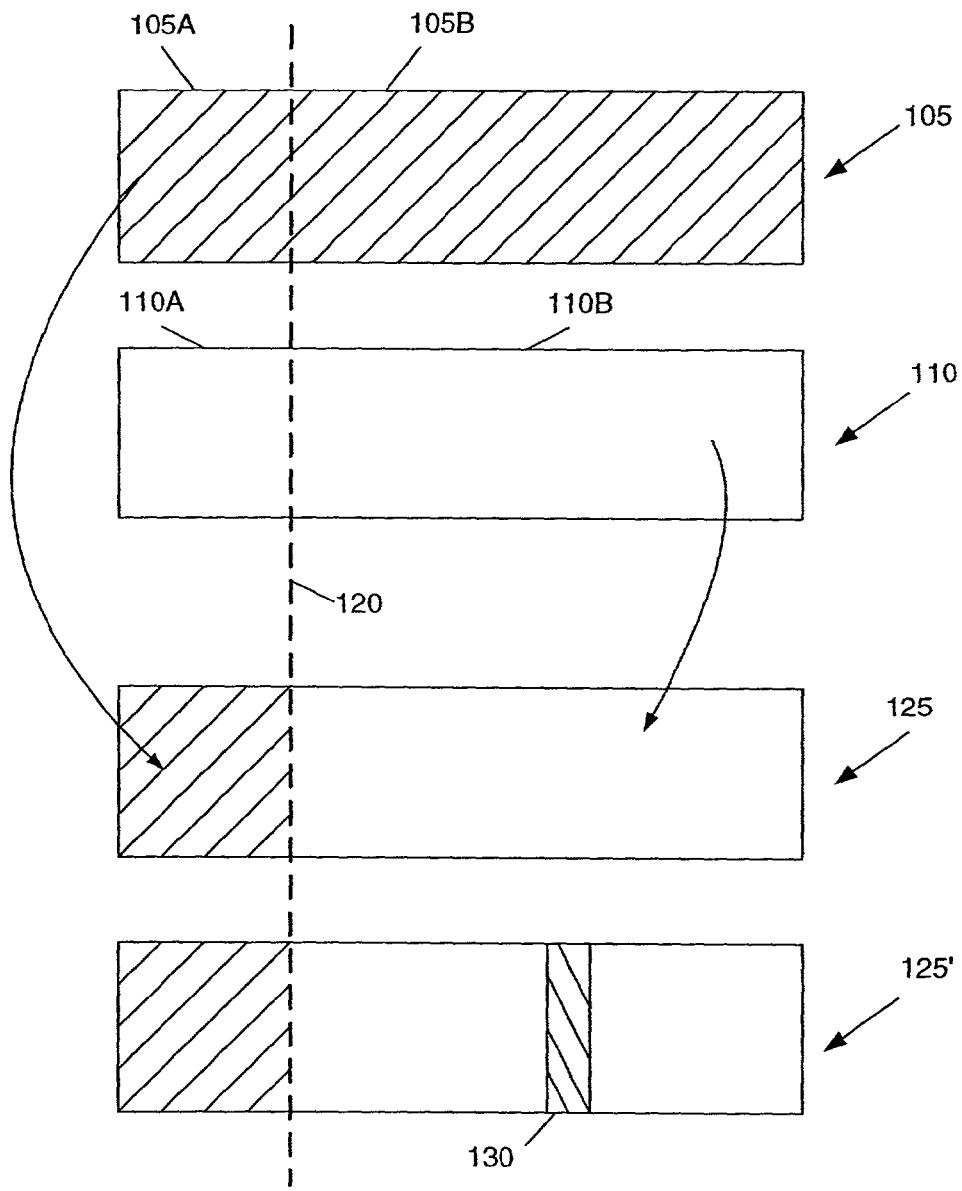
FIG. 1 illustrates a conceptual diagram of evolution in a GA machine, such as employed in the system and methodology of the present invention.

In a mutation step 340, each bit in the child chromosome C, for example, the aforedescribed bit 130 in FIG. 1, is exposed to the possibility of mutation. After one or more bits within the child chromosome C are flipped (or changed using another mechanism of random-like mutation), the mutated child chromosome C' is stored. In a preferred embodiment of the present invention, the probability of mutation for each bit is on the order of 1 percent.

After mutation, an evaluation of the child chromosome C' is made by a fitness function (step 350). A preferred fitness function is a re-configurable circuit which evaluates the problem-specific fitness of a child chromosome, as is understood in the art.

Finally, the survival of the mutated child chromosome C' is determined (step 360) based upon the fitness value F of the child chromosome C' outputted from the fitness function 350. For example, the fitness value F of the child chromosome C' is compared with the least-fit fitness value of the least-fit chromosome stored in the population memory 310. If the child chromosome C' is more fit, then the child chromosome C' replaces the less-fit chromosome in the population memory 310. If, however, the child chromosome C' is less fit, then the child chromosome C' is simply discarded.

The repetitions of the steps of this process, i.e., 320 to 360, shown in double lines, improve the quality of candidate solutions toward an optimum solution.

It should be understood that after repeated iteration of this process, the general fitness of chromosomes in the population improves. Thus, a solution to the problem emerges in the population, and an optimum or near optimum solution to the problem is acquired with highly-fit chromosomes becoming concentrated in the population.

Because of the iterative nature of the GA process, speed of execution is important. Each step 320 through 360 as described above is performed ideally during one clock cycle. The parent selection step 320, crossover step 330, mutation step 340, and survival determination step 360 are easily implemented in one clock cycle through hardware circuitry. The evaluation of each chromosome by the fitness function circuit 350 is the step that determines the speed of the execution of the problem solved by the GA machine.

When the GA machine is used to solve the TSP, as described hereinabove, the fitness function can be designed as a combinatorial problem evaluator. The measure of merit of a trial solution of an ordering or routing problem such as the TSP is the total distance of the route with a shorter distance having a higher fitness. The order of each solution is the important information in the solution, and the total distance of the route is directly related to the order of the solution. The fitness function circuit can be designed to use a table with n(n−1)/2 entries that describe the distance from every city to every other city. According to each part of the solution being evaluated, the table would return a distance value, and for each part of the solution being evaluated, the distance returned would be summed into a total distance of the solution. However, to evaluate a potential solution to the TSP by serially accessing a single distance table would still require n accesses to the table. The GA machine is capable of generating one trial solution per machine cycle, so a fitness function that can evaluate one solution per machine cycle is preferred.

Figure 4:
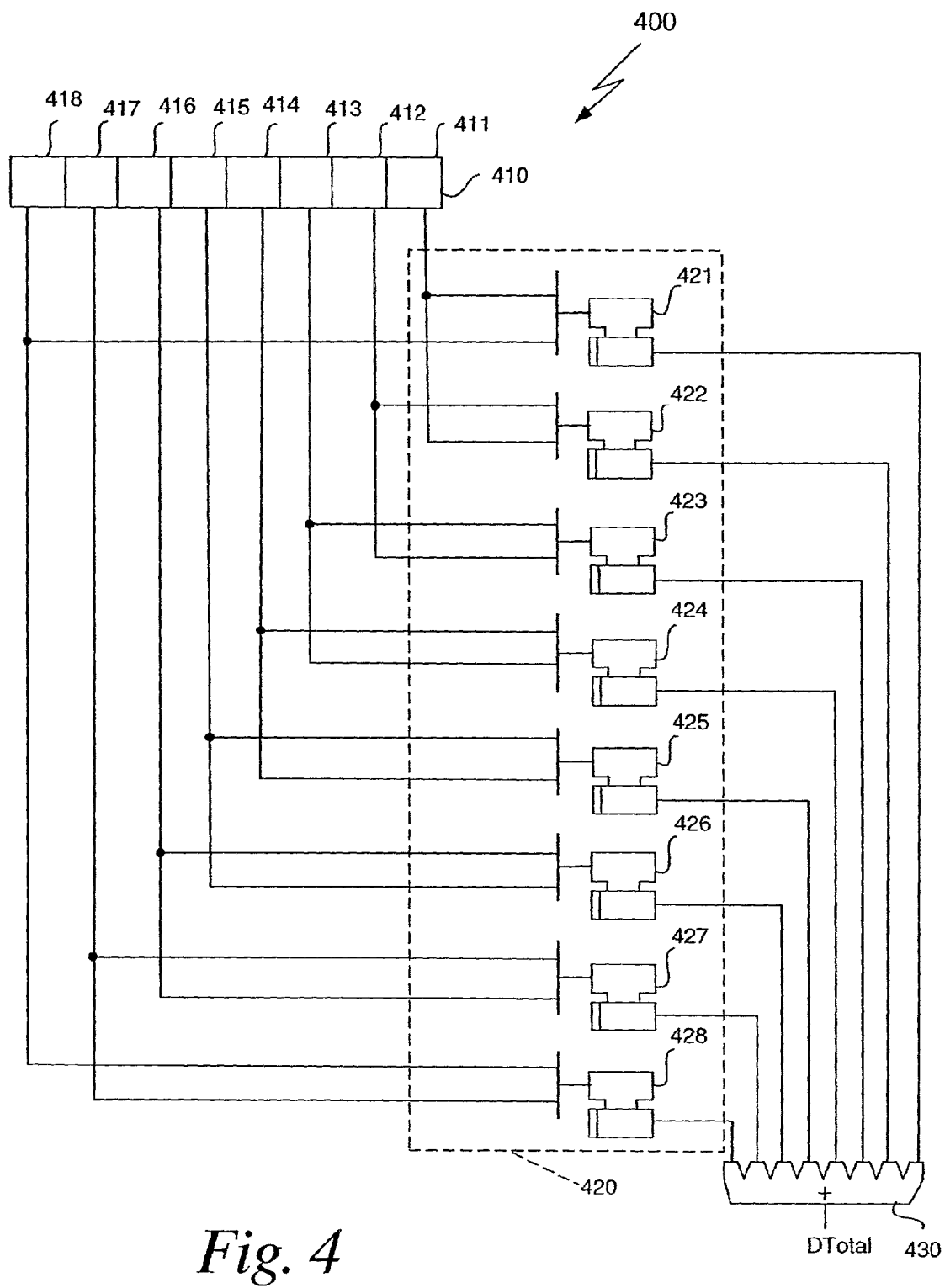
FIG. 4 depicts a diagram of a fitness function circuit for combinatorial problems such as the Traveling Salesman Problem according to the present invention.

With reference now to FIG. 4 of the Drawings, there is illustrated therein a schematic drawing of a fitness function circuit, generally designated by the reference numeral 400, for use in combinatorial problems such as the TSP, as described hereinabove. Additionally, the fitness function preferably executes in one clock cycle. As shown in FIG. 4, the circuit includes a trial solution register 410 having component parts 411–418 therein, an array of n distance table RAMs 421–428 (collectively designated by the reference numeral 420), and a carry-save-adder 430.

In operation, the circuit 400 receives a trial solution as input into the register 410 either from the initial population memory 310 or from the mutation module 340, as described in the flowchart of a GA machine in FIG. 3, and evaluates the fitness value of the solution. The fitness value of the solution is composed of the total of each part of the individual distances associated with each part of the chromosome, in the case of the TSP, or more generally, the individual values associated with the parts of the chromosome. The distances or values associated with every possible combination of chromosome are stored in the respective distance table RAM 420, which are each correlated to and accessed according to the order of each part of the values of the chromosome, i.e., the individual bits within the trial solution register 410. The distances or values obtained from each data table RAM 420 are added in a carry-save adder 430 and the total $D_{Total}$ is outputted as the fitness value of the trial solution or chromosome.

The logical operation of the combinatorial fitness function circuit will be described in detail hereinbelow.

With reference again to the circuit shown in FIG. 4, the fitness function circuit 400 receives a trial solution whose fitness is to be evaluated and stores that solution in the solution register 410. The solution register 410 is formed of multiple component parts 411–418. It should be understood that whether the trial solution is received from the initial population memory 310 or from the mutation module 340, the operation of the fitness function circuit 400 is unchanged. The solution register 410, of length eight values in the embodiment illustrated in FIG. 4, is connected to each distance table RAM 421–428 in the array of distance table RAMs 420 in a sequential order from right to left.

Each distance table RAM in the array of distance table RAMs 420 receives an input signal from two separate values from the solution register 410. In particular, the input to each distance table RAM 421–428 in the array of distance table RAMs 420 corresponds to a value from the distance table stored in the RAM, and the value retrieved from the table is transmitted as output.

As illustrated in FIG. 4, the first value 411 of the register 410, in this case a three bit length value, is connected to the distance table RAM 421 and the second distance table RAM 422. The second value 412 of the register 410 is connected to the second distance table RAM 422 and the third distance table RAM 423, and so on. Likewise, the last value 418 of the register 410 is connected to the last distance table RAM 428 and the first distance table RAM 421.

Figure 5:
FIG. 5 depicts an possible layout of a data table for use in the fitness function circuit.
Figure 6:
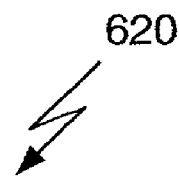
FIG. 6 depicts a more efficient layout of a data table for use in the fitness function circuit.

With reference now to FIGS. 5 and 6, there are illustrated possible layouts of the distance table 420. As illustrated in FIG. 5, a distance table, generally designated by the reference numeral 520, includes each possible value that can be received from the register 410 of FIG. 4, in this case all the values between 0 and 7, in a grid. This table, however, is inefficient because it contains extra values. Because each value must be unique, the values in the distance table 520 representing the distance from one point to the same point are invalid, as indicated in the distance table 520 grid in FIG. 5. The table also includes duplications, i.e., the distance from one point to a second point is the same as the distance from the second point back to the first. A smaller table, therefore, containing only half the information of the table illustrated in FIG. 5 is sufficient.

With reference now to FIG. 6, there is illustrated an improved, abbreviated distance table, generally designated by the reference numeral 620. As shown, no values are repeated and the table 620 contains no invalid values of the distance between one point and that same point. Accordingly, table 620 is smaller and uses less memory, while containing the same information. Rather than being size (n)(n) like the table shown in FIG. 5, the table shown in FIG. 6 is size (n)(n−1)/2. The smaller size table is advantageous because it saves space in the circuit and memory on the RAM chip. It should be apparent to those skilled in the art that circuitry (not shown for simplicity) is included at the address input of the memory to insure that x>y for each $D_{x,y}$ and that the decodable memory blocks are of such a granularity that they can be individually addressed as shown in FIG. 6. It should be further understood that due to the limited capacity of current RAM chips, problems of data fragmentation or smearing may occur requiring the use of individual decodable blocks of RAM to provide the requisite address space, as is understood in the art.

With reference again to FIG. 4, the value of the distance of each value of the solution to the next value of the solution is sent from each distance table RAM 421–428 in the array of distance table RAMs 420 to the aforementioned carry-save-adder 430. The total value $D_{Total}$ from the carry-save-adder 430 is the fitness value of the trial solution.

Figure 2:
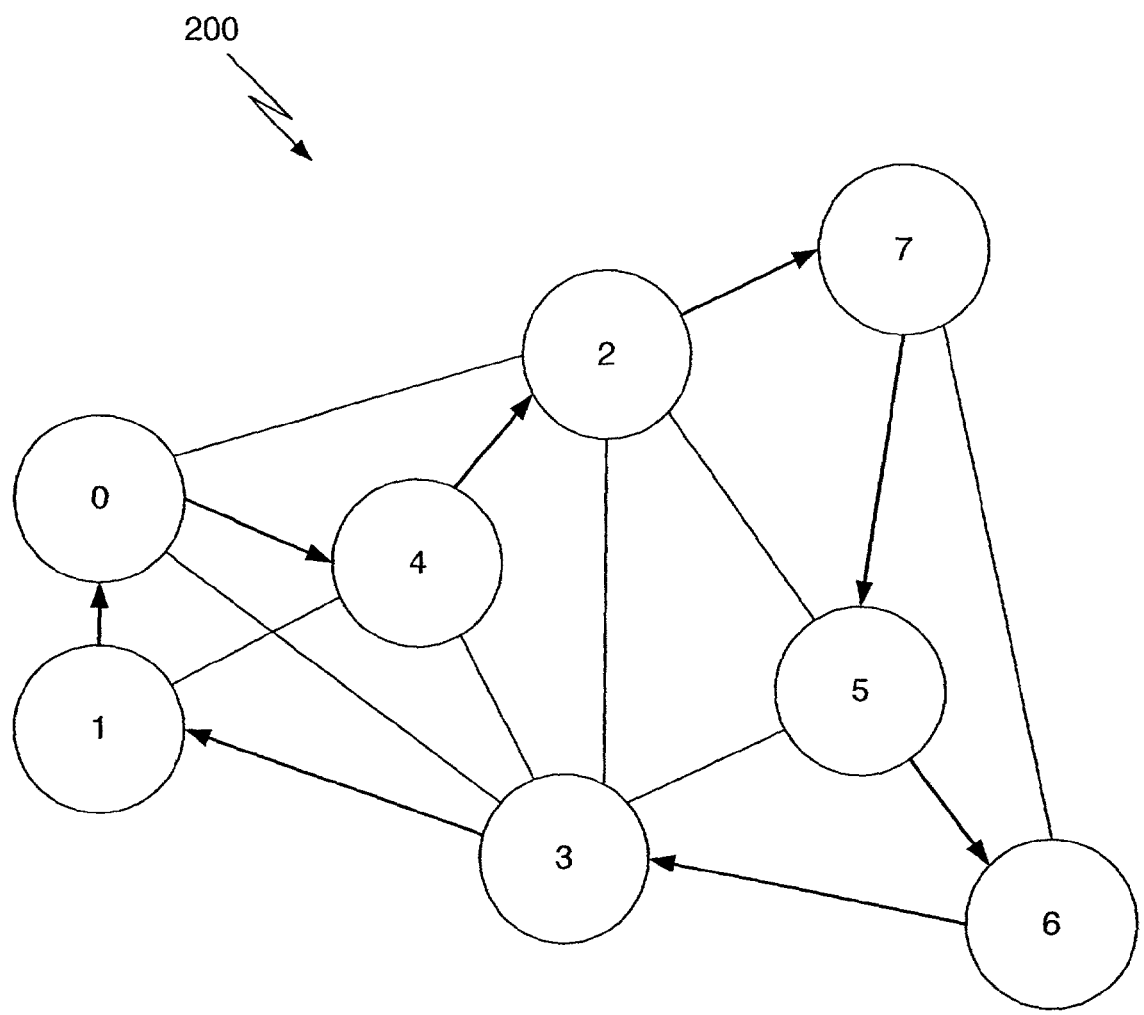
FIG. 2 illustrates a representative example of a solution of a Traveling Salesman Problem.

The operation of the fitness function circuit is illustrated now with the example of FIG. 2. In this case, the possible solution {0, 4, 2, 7, 5, 6, 3, 1} contains eight values representing eight cities with each city value having a bit length of three. This possible solution is entered into the trial solution register 410 of FIG. 4. The possible solution is then used to retrieve distance values from each distance table RAM 421–428 in the array of distance table RAMs 420.

Each value of the possible solution in the trial solution register 410 is used as one half of the address of the distance determined by the solution and retrieved from each distance table RAM 421–428 in the array of distance table RAMs 420. The first value 411 of the possible solution, i.e., {0}, when the solution is entered into the solution register 410 from right to left, is used as one part of the address transmitted to the first distance table RAM 421 and one part of the address transmitted to the second distance table RAM 422, as illustrated in FIG. 4. Similarly, the second value 412 of the possible solution, {4}, is used as one part of the address transmitted to the second distance table RAM 422 and one part of the address transmitted to the third distance table RAM 423. Likewise, for the intermediate possible solution values, i.e., 413–417, {2, 7, 5, 6, 3}, and distance table RAMs 424–427. Finally, the last value 418 of the possible solution, {1}, is used as one part of the address transmitted to the last distance table RAM 428 and one part of the address transmitted to the first distance table RAM 421, as illustrated in FIG. 4. Thus, the respective addresses transmitted to each distance table RAM 421–428 in the array of distance table RAMs 420 are {04} to the first distance table RAM 421, {42} to the second distance table RAM 422, {27} to the third distance table RAM 423, and so on to the address transmitted to the last distance table RAM 328 being {10}. In this way, each distance table RAM 421–428 in the array of distance table RAMs 420 receives an address of a specific order, each address comprised of two sequential values of the possible solution.

Each address transmitted to each distance table RAM in the array of distance table RAMs 420 retrieves a distance value related to address. With reference to the possible distance table layout of FIG. 5, each part of the address corresponds to a value on the rows of the table and on the columns. For example, the address {42} transmitted to the second distance table RAM 422, corresponds to the value $D_{4,2}$ at row 4 and column 2. The value $D_{4,2}$ corresponds to the distance between city-4 and city-2. It should therefore be understood that each value on the table corresponds to the appropriate distance.

With reference again to FIG. 4, the values retrieved from each distance table RAM 421–428 in the array of distance table RAMs 420, according to the possible solution of FIG. 2, are sent to the carry-save-adder 430 and added in parallel. Accordingly, the output $D_{Total}$ is the total sum of the distances between each value of the possible solution. In this case, $D_{Total}=D_{0,4}+D_{4,2}+D_{2,7}+D_{7,5}+D_{5,6}+D_{6,3}+D_{3,1}+D_{1,0}$, i.e., the particular distance a traveler must make to visit all of the cities in that order.

It should be understood that the output $D_{Total}$ can be used as a fitness value in the genetic algorithm. In general, the output $D_{Total}$ is the total sum of the values related to each value of the possible solution. The output $D_{Total}$ can, therefore, be employed as a fitness value in the genetic algorithm where a higher fitness is denoted by a higher fitness value, or in the case of the Traveling Salesman Problem, a lower distance value, and a lower fitness is denoted by a lower fitness value, or in the case of the Traveling Salesman Problem, a higher distance value.

This implementation of a combinatorial fitness function circuit, such as the embodiment of the present invention depicted in FIG. 4, with multiple repeated, identical data tables, evaluates each solution in one clock cycle, as required. This implementation allows the GA machine to operate at its full potential. It should be further understood that the implementation of the present invention is also scalable, with no loss of throughput beyond the simple embodiment shown in FIG. 4 and described hereinabove. For a larger combinatorial problem, such as, for instance, a 32-city TSP, then 32 distance tables are required. Although the larger problem uses more memory, each solution to the larger problem is evaluated in the same amount of time.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A fitness function circuit for determining the fitness of a potential solution for a combinatorial genetic algorithm problem, said fitness circuit comprising:

a solution register containing said potential solution for said genetic algorithm problem therein, said solution register comprising a plurality of component parts thereof;

a plurality of data tables, the number of data tables corresponding to the number of said component parts of said solution register, respective data tables having inputs from two respective ones of said component parts of said solution register, each of said data tables comprising a matrix of partial solutions to said combinatorial genetic algorithm problem, the two respective ones of said component parts determining a particular respective partial solution, each of said matrices having identical entries therein; and an adder connected to each of said plurality of data tables, said adder adding respective partial solutions from each of said plurality of data tables, thereby determining the fitness of said potential solution for said combinatorial genetic algorithm problem.

2. The fitness function circuit according to claim 1, wherein said data tables include partial solutions specific to the sequential order of the potential solution.

3. The fitness function circuit according to claim 1, wherein said adder adds said partial solutions from the respective data tables in parallel.

4. The fitness function circuit according to claim 3, wherein said partial solutions from the respective data tables are added substantially simultaneously.

5. The fitness function circuit according to claim 1, wherein each of said matrices within said data tables comprises an abbreviated matrix of partial solutions to said combinatorial genetic algorithm problem.

6. The fitness function circuit according to claim 5, wherein said abbreviated matrix contains at least $(n)(n-1)/2$ entries.

7. The fitness function circuit according to claim 1, wherein at least two of the two respective ones of said component parts correspond to different entries within said matrices.

8. The fitness function circuit according to claim 7, wherein all of the two respective ones of said component parts correspond to different entries within said matrices.

9. The fitness function circuit according to claim 8, wherein said combinatorial genetic algorithm problem is the Traveling Salesman Problem.

10. A method for determining the fitness of a potential solution for a combinatorial genetic algorithm problem, said method comprising the steps of:

inputting a plurality of potential solution values into a solution register, said solution register comprising a plurality of component parts thereof;

receiving, after said step of inputting, at each of a plurality of data tables two respective ones of said component parts of said solution register, the number of data tables corresponding to the number of said component parts of said solution register, each of said data tables comprising a matrix of partial solutions to said combinatorial genetic algorithm problem, each of the matrices having identical entries therein;

indexing said matrices of partial solutions to said genetic algorithm within said plurality of data tables, the two respective ones of said component parts determining respective particular partial solutions within the respective matrices; and adding, by an adder connected to each of the respective data tables, respective outputs from each of said data tables, whereby the sum of said adder determines the fitness of said potential solution for said combinatorial genetic algorithm problem.

11. The method according to claim 10, wherein in said step of receiving, at each of said plurality of data tables, two respective ones of said component parts of said solution register are received substantially simultaneously.

12. The method according to claim 10, wherein in said step of receiving, wherein at least two of the two respective ones of said component parts correspond to different entries within said matrices.

13. The method according to claim 12, wherein all of the two respective ones of said component parts correspond to different entries within said matrices.

14. The method according to claim 13, wherein said combinatorial genetic algorithm problem is the Traveling Salesman Problem.

15. The method according to claim 10, wherein in said step of receiving, at each of said plurality of data tables, two respective ones of said component parts of said solution register correspond to the sequential order of the potential solution values in said solution register.

16. A methodology for determining the fitness of a particular potential solution for a combinatorial genetic algorithm problem from a pool of potential solutions, said methodology comprising steps of:

(a) inputting a plurality of potential solution values into a solution register, said solution register comprising a plurality of component parts thereof;

(b) receiving, substantially simultaneously, at each of a plurality of data tables two respective ones of said component parts of said solution register, the number of data tables corresponding to the number of said component parts of said solution register, each of said data tables comprising a matrix of partial solutions specific to said genetic algorithm problem, each of the matrices having identical entries therein;

(c) indexing said matrices of partial solutions to said genetic algorithm within said plurality of data tables, the two respective ones of said component parts determining respective particular partial solutions within the respective matrices;

(d) adding, by an adder connected to each of the respective data tables, respective outputs from each of said data tables in parallel, whereby the sum of said adder determines the fitness of said particular potential solution for said genetic algorithm problem;

(e) comparing the fitness of said particular potential solution to a fitness threshold; and (f) replacing a prior potential solution from said pool of potential solutions with said particular potential solution if said fitness of said particular potential solution exceeds said fitness threshold, and otherwise deleting said particular potential solution.

17. The methodology according to claim 16, said methodology repeating said steps (a)–(f) with another particular potential solution with the same matrix of partial solutions.

18. The methodology according to claim 16, said methodology repeating said steps (a)–(f) with another particular potential solution with another matrix of partial solutions, said another matrix corresponding to partial solutions for another genetic algorithm problem.

\* \* \* \* \*

UNITED STATES PATENT AND TRADEMARK OFFICE
CERTIFICATE OF CORRECTION

PATENT NO. : 7,065,510 B2  Page 1 of 1
APPLICATION NO. : 09/986531
DATED : June 20, 2006
INVENTOR(S) : J. Barry Shackleford It is certified that error appears in the above-identified patent and that said Letters Patent is hereby corrected as shown below:

In column 6, line 54, after "connected to the" insert -- first --.

In column 8, line 60, in Claim 1, after "said" insert -- combinatorial --.

Signed and Sealed this

Third Day of March, 2009

JOHN DOLL
*Acting Director of the United States Patent and Trademark Office*